July 14, 1931. J. MORGENSTERN 1,814,449
SWITCH BOX
Filed Oct. 24, 1924
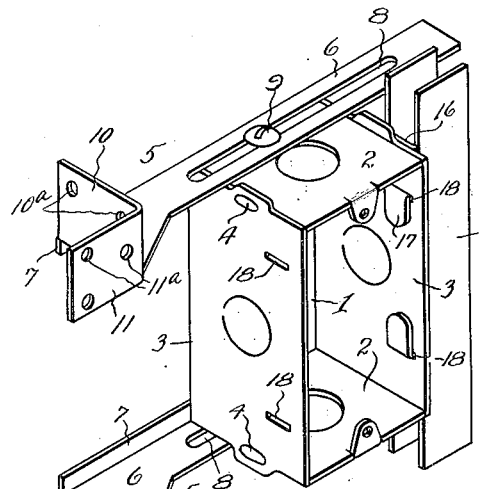
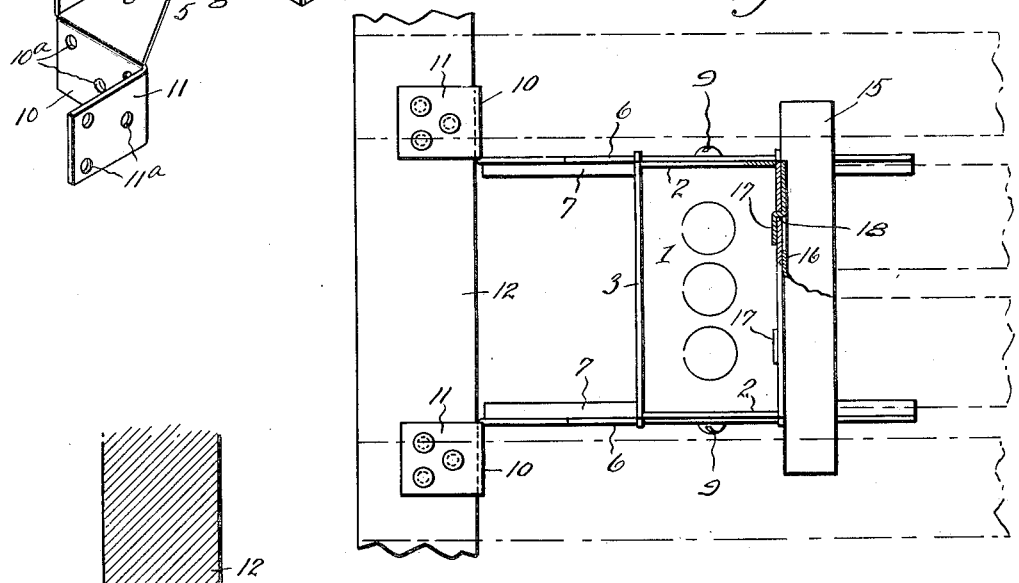
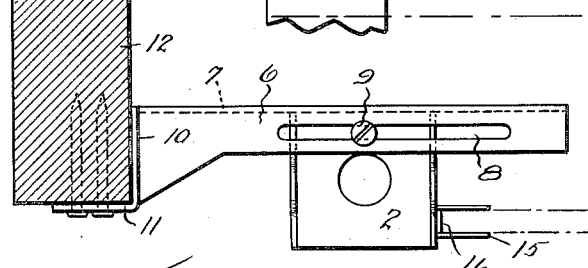
Inventor
J. Morgenstern
By Stull, Brock & West
Attys.

Patented July 14, 1931

1,814,449

UNITED STATES PATENT OFFICE

JOSEPH MORGENSTERN, OF CLEVELAND, OHIO

SWITCH BOX

Application filed October 24, 1924. Serial No. 745,559.

This invention relates to switch boxes of the class used in the electrical wiring of houses, and it has to do more particularly with improved supporting means therefor.

The objects in view are to provide brackets by means of which a switch box may be supported at different distances from a stud or the like and with its open front in a plane having a given relation, and parallel to the front plane of the studding thereby to properly position the box with respect to the ultimate wall surface after the lathing and plastering have been completed; and to provide supporting means or brackets for switch boxes of such nature as will greatly facilitate the installation of the box, the brackets having provision for attaching them to either the side or front of a stud.

Further and more general objects are to provide switch box supporting means that is simple of construction and economical of production and is highly efficient.

The foregoing objects, with others hereinafter appearing, are obtained in the embodiment of the invention illustrated in the accompanying drawing, wherein Fig. 1 is a perspective view of a switch box incorporating the invention; Fig. 2 is a front elevation of the switch box and its supporting brackets, a stud to which the box is attached and adjacent laths being indicated in dot-and-dash line; and Fig. 3 is a plan view of what is shown in Fig. 2.

The switch box is made up of a substantially U-shaped member forming the bottom wall 1 and end walls 2, and side walls 3 are applied to said member and are shown as secured thereto by the common expedient of projecting tongues 4 of the end walls through openings in the side walls and riveting or upsetting said projections therebeyond.

Brackets 5 are applied to the upper and lower ends of the box, and except for the fact that one of the brackets has its parts reversed with respect to those of the other, the brackets are identical. Each comprises an elongated base 6 along the rear edge of which a shallow flange 7 extends, and the base has a longitudinal slot 8 for the accommodation of a screw 9 that is threaded into the adjacent end wall 2 of the box, the rear corners of the box fitting within the angles between the bases 6 and flanges 7 of the two brackets. The base of each bracket at one of its ends is widened and joins an attaching plate 10, said plate being perpendicular to the plane of the base; and from the forward end of each attaching plate extends a lug 11 that is in a plane at right angles to that of the attaching plate but parallel to that of the flange 7. As a consequence of this, the lugs 11 of the two brackets are assured a parallel relation to the open front of a switch box to which the brackets are applied. The attaching plates and lugs are preferably formed integral with the bracket, the entire unit being desirably constituted of a sheet metal stamping and they are provided with holes 10$^a$ and 11$^a$ for the accommodation of fastening means, such as screws or nails, for securing the brackets to the stud, designated 12 in Figs. 2 and 3.

Applied to one side of the box is a channel member 15. Struck from the web 16 of the channel member are tongues 17 that are extended through slots 18 in the side wall and turned over inside the box. The channel member constitutes a support for the free ends of laths which terminate at the box, and since the web of the channel member is of a length substantially equal to the length of the switch box and considerably shorter than the side flanges, the side flanges may embrace continuous laths which extend between adjacent studding above and below the box. Both side walls 3 have slots 18 so that a second channel member 15 may be secured to the side of the box next to the stud from which the box is supported if the spacing of the box from the stud is great enough to require a support for the ends of the laths on this side of the box. If adjacent studs between which the box is to be placed are so close together that it makes it inconvenient to use the apertures 10$^a$ of the attaching plates 10 for the nails or screws by means of which the brackets are secured to the stud, the apertures 11$^a$ of the lugs 11 may be employed for the purpose; and the box may be readily shifted with respect to the brackets so as to locate it at any desired distance from the stud within the range of the slots 8. The lugs 11, besides serving as alternatives for the attaching plates 10, properly position the open front of the switch box with respect to the face of the studding so that the front of the box will be substantially flush with the ultimate wall surface.

My present invention is an elaboration upon that constituting the subject matter of my co-pending application Serial No. 703,085, filed March 31, 1924.

Having thus described my invention, what I claim is:—

1. In combination with a switch box of the class described, brackets adapted to be attached to the opposite ends thereof and extend laterally therefrom for supporting the box from a stud or the like, each bracket comprising a base and a flange along one side of the base, the box fitting within the angle between the base and flange, and means adjustably securing the brackets to the box, each bracket terminating at one end in an attaching plate for application to the stud.

2. In combination with a switch box of the class described having substantially right angular top and bottom rear corners, brackets for attachment to the ends of the box, each bracket comprising a base and a flange along one edge of the base, a rear corner of the box fitting within the angle between the base and flange, the base having a longitudinal slot, and a screw extending through said slot and threaded into the adjacent end of the box, each bracket terminating at one end in an attaching plate and a lug extending at right angles from the front edge of the attaching plate, the attaching plate and lug being provided with means for securing the bracket to a stud or the like.

3. In combination with a switch box having an open front, rigid, permanently shaped brackets for application to the opposite ends of the box, each bracket comprising a base having a longitudinal slot and terminating at one end in an attaching plate and a lug disposed at right angles to said plate, the attaching plate and lug being arranged for application respectively to the side and front surfaces of a stud or the like and being provided with means for attaching the bracket to the stud, and a screw extending through the slot of each bracket and threaded into the adjacent end wall of the box, the box and bracket having parts cooperating to maintain the bracket in parallelism with the front of the box.

4. A bracket for use with switch boxes of the class described comprising a base, a flange along one edge of the base at right angles thereto, the base being wider at one end than at the other, an attaching plate projecting at right angles from the wider end of the base in a direction from the plane thereof opposite that of said flange, and a lug extending from one edge of the attaching plate at right angles thereto and to the plane of the base but in a plane substantially parallel to that of the aforesaid flange, the angle between the base and flange being unobstructed for the reception of the corner of the switch box, and the base having means for securing the switch box to it in different adjusted positions therealong.

In testimony whereof, I hereunto affix my signature.

JOSEPH MORGENSTERN.